US012649182B2

(12) United States Patent
Katayama et al.

(10) Patent No.: US 12,649,182 B2
(45) Date of Patent: Jun. 9, 2026

(54) COPPER POWDER FOR 3D PRINTING, METHOD FOR PRODUCING COPPER POWDER FOR 3D PRINTING, METHOD FOR PRODUCING 3D PRINTED ARTICLE, AND 3D PRINTED ARTICLE

(71) Applicants:MEC COMPANY., LTD., Amagasaki (JP); OSAKA RESEARCH INSTITUTE OF INDUSTRIAL SCIENCE AND TECHNOLOGY, Izumi (JP)

(72) Inventors: Daisuke Katayama, Hyogo (JP); Masato Nakazawa, Hyogo (JP); Kaori Igami, Hyogo (JP); Takahiro Sugahara, Osaka (JP); Takayuki Nakamoto, Osaka (JP); Takao Miki, Osaka (JP); Sohei Uchida, Osaka (JP)

(73) Assignees: MEC COMPANY, LTD., Amagasaki (JP); OSAKA RESEARCH INSTITUTE OF INDUSTRIAL SCIENCE AND TECHNOLOGY, Izumi (JP)

( * ) Notice: Subject to any disclaimer, the term of this patent is extended or adjusted under 35 U.S.C. 154(b) by 1235 days.

(21) Appl. No.: 17/295,205

(22) PCT Filed: Nov. 29, 2019

(86) PCT No.: PCT/JP2019/046833
§ 371 (c)(1),
(2) Date: May 19, 2021

(87) PCT Pub. No.: WO2020/116349
PCT Pub. Date: Jun. 11, 2020

(65) Prior Publication Data
US 2021/0387255 A1     Dec. 16, 2021

(30) Foreign Application Priority Data
Dec. 4, 2018   (JP) ................................. 2018-227428
Sep. 3, 2019   (JP) ................................. 2019-160474

(51) Int. Cl.
| | |
|---|---|
| *B22F 1/05* | (2022.01) |
| *B22F 1/142* | (2022.01) |
| *B22F 10/28* | (2021.01) |
| *B33Y 70/00* | (2020.01) |
| *B33Y 80/00* | (2015.01) |

(52) U.S. Cl.
CPC ................ *B22F 1/05* (2022.01); *B22F 1/142* (2022.01); *B22F 10/28* (2021.01); *B33Y 70/00* (2014.12); *B33Y 80/00* (2014.12); *B22F 2301/10* (2013.01); *B22F 2302/25* (2013.01); *B22F 2304/10* (2013.01)

(58) Field of Classification Search
None
See application file for complete search history.

(56) References Cited

U.S. PATENT DOCUMENTS

| | | | |
|---|---|---|---|
| 2013/0164553 A1 | 6/2013 | Lee et al. | |
| 2016/0332227 A1 | 11/2016 | Tsubota et al. | |
| 2020/0070244 A1* | 3/2020 | Sakuramoto | ........... H01B 1/026 |
| 2021/0178465 A1* | 6/2021 | Endo | ......................... B22F 1/05 |

FOREIGN PATENT DOCUMENTS

| | | | |
|---|---|---|---|
| CA | 3014690 A1 * | 10/2018 | |
| JP | 2006118032 A | 5/2006 | |
| JP | 2013136840 A | 7/2013 | |
| JP | 2016211062 A | 12/2016 | |
| JP | 2017141505 A | 8/2017 | |
| JP | 2018178239 A | 11/2018 | |
| WO | 2019017467 A1 | 1/2019 | |

OTHER PUBLICATIONS

International Search Report and Written Opinion issued in corresponding International Patent Application No. PCT/JP2019/046833 (with English translation of International Search Report) dated Jan. 21, 2020 (10 pages).

* cited by examiner

*Primary Examiner* — Keith D. Hendricks
(74) *Attorney, Agent, or Firm* — Kilyk & Bowersox, P.L.L.C.

(57)     ABSTRACT

The present invention relates to a copper powder for additive manufacturing, a method for producing the same, an additive manufactured product, a method for producing the same and the like, and an object of the present invention is to provide a copper powder for additive manufacturing that can sufficiently improve the mechanical strength and electrical conductivity of an additive manufactured product. The means for achieving the above-mentioned object of the present invention is, for example, a copper powder for additive manufacturing having a mean particle size of 1 $\mu$m or more and 150 $\mu$m or less, containing copper oxide in an amount of 0.10 $g/m^2$ or more and 7.0 $g/m^2$ or less per unit surface area and 0.5 mass % or more and 9.4 mass % or less per unit mass.

9 Claims, 22 Drawing Sheets

Table 1

| | Particle size d50 [μm] | Baking temperature [°C] | Baking time [hr] |
|---|---|---|---|
| Untreated A | 10 | - | - |
| Copper powder 1 | 10 | 140 | 1.75 |
| Copper powder 2 | 10 | 140 | 3.50 |
| Untreated B | 20 | - | - |
| Copper powder 3 | 20 | 140 | 3.75 |
| Copper powder 4 | 20 | 140 | 8.50 |
| Copper powder 5 | 20 | 140 | 17 |
| Copper powder 6 | 20 | 175 | 15.75 |
| Untreated C | 46 | - | - |
| Copper powder 7 | 46 | 150 | 24 |
| Copper powder 8 | 46 | 167 | 15 |
| Copper powder 9 | 46 | 175 | 24 |
| Copper powder 10 | 46 | 200 | 20 |
| Untreated D | 80 | - | - |
| Copper powder 11 | 80 | 195 | 24 |
| Copper powder 12 | 80 | 200 | 72 |
| Copper powder 13 | 80 | 280 | 14 |

Fig. 5

Table 2

Untreated A

| Particle size d50 | Baking temperature [°C] | Baking time [hr] | Laser scanning speed [mm/s] | Relative density (Archimedes method) [%] | Percentage of void [%] | Conductivity [IACS%] | Cu2O concentration [mass%] |
|---|---|---|---|---|---|---|---|
| 10 | | | 200 | | | Impossible to manufacture | |
| | | | 400 | | | Impossible to manufacture | |
| | | | 600 | | | Impossible to manufacture | |
| | | | 800 | | | Impossible to manufacture | |
| | | | 1000 | | | Impossible to manufacture | |
| | | | 1200 | | | Impossible to manufacture | |

Fig. 6

Copper powder 1

Table 3

| Particle size d50 | Baking temperature [°C] | Baking time [hr] | Laser scanning speed [mm/s] | Relative density (Archimedes method) [%] | Percentage of void [%] | Conductivity [IACS%] | Cu2O concentration [mass%] |
|---|---|---|---|---|---|---|---|
| 10 | 140 | 1.75 | 200 | 94.3 | 5.4 | 85.7 | 0.98 |
| | | | 400 | 93.1 | 8.2 | 84.8 | 1.16 |
| | | | 600 | 93.0 | 9.8 | 81.8 | 1.11 |
| | | | 800 | 92.8 | 13.1 | 80.1 | 1.48 |
| | | | 1000 | 91.7 | 13.0 | 76.3 | 1.26 |
| | | | 1200 | 90.3 | 11.0 | 73.4 | 1.33 |

Fig. 7

Table 4

Copper powder 2

| Particle size d50 | Baking temperature [°C] | Baking time [hr] | Laser scanning speed [mm/s] | Relative density (Archimedes method) [%] | Percentage of void [%] | Conductivity [IACS%] | Cu$_2$O concentration [mass%] |
|---|---|---|---|---|---|---|---|
| 10 | 140 | 3.50 | 200 | 97.5 | 0.6 | 85.7 | 2.36 |
| | | | 400 | 97.2 | 0.6 | 84.8 | 1.77 |
| | | | 600 | 96.4 | 2.3 | 82.7 | 1.95 |
| | | | 800 | 94.7 | 4.5 | 77.6 | 2.17 |
| | | | 1000 | 93.1 | 7.0 | 71.7 | 2.50 |
| | | | 1200 | 90.9 | 9.2 | 68.8 | 2.87 |

Fig. 8

Table 5

| | Particle size d50 | Baking temperature [°C] | Baking time [hr] | Laser scanning speed [mm/s] | Relative density (Archimedes method) [%] | Percentage of void [%] | Conductivity [IACS%] | Cu2O concentration [% by mass] |
|---|---|---|---|---|---|---|---|---|
| Untreated B | 20 | | | 400 | 92.1 | 16.2 | 84.0 | 0 |

Fig. 9

Table 6

Copper powder 3

| Particle size d50 | Baking temperature [°C] | Baking time [hr] | Laser scanning speed [mm/s] | Relative density (Archimedes method) [%] | Percentage of void [%] | Conductivity [IACS%] | $Cu_2O$ concentration [mass%] |
|---|---|---|---|---|---|---|---|
| 20 | 140 | 3.75 | 200 | 96.8 | 10.5 | 88.6 | 1.65 |
| | | | 400 | 95.7 | 11.9 | 84.4 | 1.63 |
| | | | 600 | 93.9 | 15.7 | 82.3 | 1.82 |
| | | | 800 | 92.8 | 21.0 | 79.4 | 1.85 |
| | | | 1000 | 91.5 | 21.0 | 77.6 | 1.69 |
| | | | 1200 | 90.4 | 15.8 | 72.9 | 1.72 |

Fig. 10

Table 7

Copper powder 4

| Particle size d50 | Baking temperature [°C] | Baking time [hr] | Laser scanning speed [mm/s] | Relative density (Archimedes method) [%] | Percentage of void [%] | Conductivity [IACS%] | Cu2O concentration [mass%] |
|---|---|---|---|---|---|---|---|
| 20 | 140 | 8.50 | 200 | 97.7 | 1.9 | 90.5 | 2.43 |
| | | | 400 | 96.9 | 1.3 | 84.8 | 1.74 |
| | | | 600 | 96.3 | 6.3 | 84.8 | 1.99 |
| | | | 800 | 95.5 | 7.0 | 84.0 | 1.94 |
| | | | 1000 | 94.4 | 6.5 | 79.7 | 2.02 |
| | | | 1200 | 92.9 | 6.5 | 75.5 | 2.25 |

Fig. 11

Table 8

Copper powder 5

| Particle size d50 | Baking temperature [°C] | Baking time [hr] | Laser scanning speed [mm/s] | Relative density (Archimedes method) [%] | Percentage of void [%] | Conductivity [IACS%] | Cu2O concentration [mass%] |
|---|---|---|---|---|---|---|---|
| 20 | 140 | 17 | 200 | 97.2 | 1.0 | 78.4 | 2.77 |
| | | | 400 | 97.2 | 1.4 | 81.4 | 2.54 |
| | | | 600 | 96.2 | 0.1 | 81.0 | 2.61 |
| | | | 800 | 94.5 | 0.1 | 77.6 | 2.89 |
| | | | 1000 | 93.0 | 3.6 | 72.9 | 3.39 |
| | | | 1200 | 91.7 | 9.6 | 69.7 | 3.51 |

Fig. 12

Table 9

| Copper powder 6 | | | | | | | |
|---|---|---|---|---|---|---|---|
| Particle size d50 | Baking temperature [°C] | Baking time [hr] | Laser scanning speed [mm/s] | Relative density (Archimedes method) [%] | Percentage of void [%] | Conductivity [IACS%] | Cu2O concentration [mass%] |
| 20 | 175 | 15.75 | 200 | | Impossible to manufacture | Impossible to manufacture | |
| | | | 400 | | Impossible to manufacture | Impossible to manufacture | |
| | | | 600 | | Impossible to manufacture | Impossible to manufacture | |
| | | | 800 | | Impossible to manufacture | Impossible to manufacture | |
| | | | 1000 | 87.6 | 8.7 | 48.0 | 7.81 |
| | | | 1200 | 87.4 | 11.5 | 49.3 | 8.25 |

Fig. 13

Table 10

Copper powder 7

| Particle size d50 | Baking temperature [°C] | Baking time [hr] | Laser scanning speed [mm/s] | Relative density (Archimedes method) [%] | Percentage of void [%] | Conductivity [IACS%] | Cu2O concentration [mass%] |
|---|---|---|---|---|---|---|---|
| 46 | 150 | 24 | 200 | 96.3 | 3.9 | 87.8 | 1.66 |
| | | | 400 | 95.7 | 2.0 | 87.4 | 1.60 |
| | | | 600 | 96.7 | 7.5 | 86.5 | 1.37 |
| | | | 800 | 94.7 | 3.4 | 84.8 | 4.53 |
| | | | 1000 | 93.3 | 3.6 | 78.9 | 2.09 |
| | | | 1200 | 91.7 | 11.4 | 74.6 | 2.14 |

Fig. 14

Table 11

Copper powder 8

| Particle size d50 | Baking temperature [°C] | Baking time [hr] | Laser scanning speed [mm/s] | Relative density (Archimedes method) [%] | Percentage of void [%] | Conductivity [IACS%] | Cu2O concentration [mass%] |
|---|---|---|---|---|---|---|---|
| 46 | 167 | 15 | 200 | 97.5 | 0.5 | 85.1 | 2.18 |
| | | | 400 | 97.3 | 1.5 | 84.8 | 1.87 |
| | | | 600 | 96.5 | 2.2 | 82.4 | 2.18 |
| | | | 800 | 95.1 | 4.0 | 78.2 | 2.62 |
| | | | 1000 | 93.5 | 6.8 | 72.1 | 2.84 |
| | | | 1200 | 91.7 | 7.0 | 67.5 | 3.33 |

Fig. 15

Table 12

Copper powder 9

| Particle size d50 | Baking temperature [°C] | Baking time [hr] | Laser scanning speed [mm/s] | Relative density (Archimedes method) [%] | Percentage of void [%] | Conductivity [IACS%] | Cu2O concentration [mass%] |
|---|---|---|---|---|---|---|---|
| 46 | 175 | 24 | 200 | 96.9 | 0.3 | 77.2 | 3.37 |
| | | | 400 | 96.4 | 1.1 | 75.9 | 2.95 |
| | | | 600 | 93.5 | 4.9 | 67.2 | 2.58 |
| | | | 800 | 93.4 | 4.8 | 66.5 | 4.51 |
| | | | 1000 | 92.1 | 5.3 | 61.0 | 4.28 |
| | | | 1200 | 90.7 | 8.4 | 59.1 | 4.79 |

Fig. 16

Table 13

Copper powder 10

| Particle size d50 | Baking temperature [°C] | Baking time [hr] | Laser scanning speed [mm/s] | Relative density (Archimedes method) [%] | Percentage of void [%] | Conductivity [IACS%] | Cu2O concentration [mass%] |
|---|---|---|---|---|---|---|---|
| 46 | 200 | 20 | 200 | 95.7 | 0.4 | 68.1 | 4.52 |
| | | | 400 | 95.4 | 4.4 | 61.0 | 3.93 |
| | | | 600 | 92.0 | 6.0 | 58.4 | 5.00 |
| | | | 800 | 93.0 | 5.4 | 58.9 | 5.11 |
| | | | 1000 | 92.0 | 6.1 | 57.5 | 5.08 |
| | | | 1200 | 90.7 | 8.9 | 56.5 | 6.21 |

Fig. 17

Table 14

Copper powder 11

| Particle size d50 | Baking temperature [°C] | Baking time [hr] | Laser scanning speed [mm/s] | Relative density (Archimedes method) [%] | Percentage of void [%] | Conductivity [IACS%] | Cu2O concentration [mass%] |
|---|---|---|---|---|---|---|---|
| 80 | 195 | 24 | 200 | 96.3 | 2.2 | 85.2 | 1.50 |
| | | | 400 | 93.2 | 3.9 | 81.8 | 1.52 |
| | | | 600 | 89.9 | 3.3 | 72.1 | 1.89 |
| | | | 800 | 87.4 | 7.4 | 61.0 | 2.34 |
| | | | 1000 | 86.3 | 13.1 | 57.0 | 2.82 |
| | | | 1200 | 85.0 | 16.2 | 48.8 | 2.86 |

Fig. 18

Table 15

Copper powder 12

| Particle size d50 | Baking temperature [°C] | Baking time [hr] | Laser scanning speed [mm/s] | Relative density (Archimedes method) [%] | Percentage of void [%] | Conductivity [IACS%] | Cu2O concentration [mass%] |
|---|---|---|---|---|---|---|---|
| 80 | 200 | 72 | 200 | 96.3 | 0.6 | 76.3 | 3.26 |
| | | | 400 | 93.1 | 6.9 | 69.4 | 3.42 |
| | | | 600 | 89.3 | 10.9 | 64.3 | 3.70 |
| | | | 800 | 86.7 | 16.6 | 60.1 | 4.21 |
| | | | 1000 | 84.9 | 18.3 | 53.5 | 4.63 |
| | | | 1200 | 82.7 | 21.4 | 50.4 | 5.06 |

Fig. 19

Table 16

Copper powder 13

| Particle size d50 | Baking temperature [°C] | Baking time [hr] | Laser scanning speed [mm/s] | Relative density (Archimedes method) [%] | Percentage of void [%] | Conductivity [IACS%] | Cu₂O concentration [mass%] |
|---|---|---|---|---|---|---|---|
| 80 | 280 | 14 | 200 | 94.6 | 0.9 | 59.7 | 5.65 |
| | | | 400 | 89.0 | 11.6 | 49.6 | 6.40 |
| | | | 600 | 86.9 | 12.1 | 45.5 | 7.02 |
| | | | 800 | 84.8 | 11.7 | 43.4 | 8.37 |
| | | | 1000 | 83.8 | 16.2 | 39.7 | 7.32 |
| | | | 1200 | 84.9 | 21.0 | 35.8 | 8.34 |

Fig. 20

Table 17

| | Particle size d50 | Baking temperature [°C] | Baking time [hr] | Angle of repose | Cu$_2$O concentration [mass%] | CuO concentration [mass%] | O concentration [mass%] | Specific surface area before removal of copper oxide [m$^2$/g] | Specific surface area after removal of copper oxide [m$^2$/g] | Copper oxide concentration per unit surface area [g/m$^2$] | Rate of change of specific surface area [%] | Coating peeling rate [%] |
|---|---|---|---|---|---|---|---|---|---|---|---|---|
| Untreated A | 10 | - | - | 53.8° | 0.38 | 0 | 0.04 | 0.073 | 0.073 | 0.05 | 0 | 0 |
| Copper powder 1 | 10 | 140 | 1.75 | 48.0° | 1.52 | 0 | 0.17 | 0.076 | 0.072 | 0.21 | 5.6 | 0 |
| Copper powder 2 | 10 | 140 | 3.50 | 47.2° | 3.11 | 0 | 0.35 | 0.078 | 0.074 | 0.42 | 5.4 | 26 |
| Untreated B | 20 | - | - | 51.6° | 0.35 | 0 | 0.04 | 0.040 | 0.040 | 0.09 | 0 | 0 |
| Copper powder 3 | 20 | 140 | 3.75 | 34.9° | 1.87 | 0 | 0.21 | 0.046 | 0.039 | 0.48 | 17.9 | 0 |
| Copper powder 4 | 20 | 140 | 8.50 | 32.4° | 2.32 | 0 | 0.26 | 0.047 | 0.040 | 0.58 | 17.5 | 0 |
| Copper powder 5 | 20 | 140 | 17 | 31.0° | 4.22 | 0 | 0.47 | 0.042 | 0.039 | 1.08 | 7.7 | 0 |
| Copper powder 6 | 20 | 175 | 15.75 | 37.7° | 9.48 | 0 | 1.06 | 0.055 | 0.040 | 2.37 | 37.5 | 71 |
| Untreated C | 46 | - | - | 44.1° | 0.38 | 0 | 0.04 | 0.019 | 0.019 | 0.20 | 0 | 0 |
| Copper powder 7 | 46 | 150 | 24 | 35.4° | 1.82 | 0 | 0.20 | 0.023 | 0.020 | 0.91 | 15.0 | 18 |
| Copper powder 8 | 46 | 167 | 15 | 35.6° | 3.42 | 0 | 0.38 | 0.024 | 0.018 | 1.90 | 33.3 | 15 |
| Copper powder 9 | 46 | 175 | 24 | 35.2° | 5.21 | 0 | 0.58 | 0.027 | 0.019 | 2.74 | 42.1 | 76 |
| Copper powder 10 | 46 | 200 | 20 | 41.5° | 7.09 | 0 | 0.79 | 0.034 | 0.019 | 3.73 | 78.9 | 76 |
| Untreated D | 80 | - | - | 36.5° | 0.06 | 0 | 0.01 | 0.015 | 0.015 | 0.04 | 0 | 0 |
| Copper powder 11 | 80 | 195 | 24 | 33.6° | 3.38 | 0 | 0.38 | 0.015 | 0.015 | 2.25 | 0 | 42 |
| Copper powder 12 | 80 | 200 | 72 | 34.1° | 5.37 | 0 | 0.60 | 0.015 | 0.015 | 3.58 | 0 | 73 |
| Copper powder 13 | 80 | 280 | 14 | 38.5° | 5.86 | 2.76 | 1.11 | 0.015 | 0.015 | 5.75 | 0 | 62 |

Fig. 21

Table 18

| | UNTREATED A | COPPER POWDER1 | COPPER POWDER2 |
|---|---|---|---|
| REFLECTANCE [%] | 70.9 | 62.8 | 40.4 |

| | UNTREATED B | COPPER POWDER3 | COPPER POWDER4 | COPPER POWDER5 | COPPER POWDER6 |
|---|---|---|---|---|---|
| REFLECTANCE [%] | 66.9 | 40.7 | 34.3 | 39.3 | 32.2 |

| | UNTREATED C | COPPER POWDER7 | COPPER POWDER8 | COPPER POWDER9 | COPPER POWDER10 |
|---|---|---|---|---|---|
| REFLECTANCE [%] | 65.2 | 29.0 | 31.3 | 29.6 | 31.0 |

| | UNTREATED D | COPPER POWDER11 | COPPER POWDER12 | COPPER POWDER13 |
|---|---|---|---|---|
| REFLECTANCE [%] | 65.0 | 25.4 | 28.8 | 22.9 |

Fig. 22

COPPER POWDER FOR 3D PRINTING, METHOD FOR PRODUCING COPPER POWDER FOR 3D PRINTING, METHOD FOR PRODUCING 3D PRINTED ARTICLE, AND 3D PRINTED ARTICLE

TECHNICAL FIELD

The present invention relates to a copper powder for additive manufacturing, a method for producing a copper powder for additive manufacturing, a method for producing an additive manufactured product, and an additive manufactured product.

BACKGROUND ART

The three-dimensional additive manufacturing technique is capable of producing products having complicated shapes, which cannot be produced by conventional processing techniques such as cutting, and is expected to be applied in various fields. In recent years, various studies have been also made on additive manufacturing methods in which a metal powder is used.

Copper is often used for parts that require mechanical strength and high electrical conductivity, and the development of additive manufacturing technique in which copper is used is required.

Metal powders containing copper for additive manufacturing are disclosed, for example, in Patent Document 1 and Patent Document 2.

Patent Document 1 discloses a copper alloy powder for additive manufacturing containing chromium or silicon. Patent Document 2 discloses a copper powder for additive manufacturing on which an oxide film is formed by irradiation of the surface with a laser beam.

However, an additive manufactured product manufactured by using a copper powder is likely to have voids, and improvement of its mechanical strength is difficult. The electrical conductivity in an additive manufactured product is considerably lower than that of pure copper. Thus, it is difficult to sufficiently improve the mechanical strength and electrical conductivity of an additive manufactured product manufactured by using a copper powder.

DOCUMENTS FOR PRIOR ART

Patent Documents

Patent Document 1: JP 2016-211062 A
Patent Document 2: JP 2017-141505 A

SUMMARY OF INVENTION

Technical Problem

The present invention has been made in view of the above-mentioned problems of the conventional art, and an object of the present invention is to provide a copper powder for additive manufacturing that can sufficiently improve the mechanical strength and electrical conductivity of an additive manufactured product, and a method for producing the same.

Another object of the present invention is to provide an additive manufactured product having sufficiently high mechanical strength and electrical conductivity, and a method for producing the same.

Solution to Problem

The present invention of a copper powder for additive manufacturing has a mean particle size of 1 μm or more and 150 μm or less, and contains copper oxide in an amount of 0.10 $g/m^2$ or more and 7.0 $g/m^2$ or less per unit surface area and 0.5 mass % or more and 9.4 mass % or less per unit mass.

The present invention may have a reflectance for light having a wavelength of 1070 nm of 65% or less.

The present invention may have an angle of repose of 50 degrees or less.

The present invention may contain 0.5 mass % or more and 9.4 mass % or less of cuprous oxide ($Cu_2O$).

The present invention may have a content of cupric oxide (CuO) of 1.7 mass % or less.

The present invention may have a content of cuprous oxide ($Cu_2O$) of 1.3 mass % or more and 9.4 mass % or less, and a content of cupric oxide (CuO) of 1.7 mass % or less.

The present invention may have a rate of change of specific surface area of 50% or less.

The present invention may have a coating peeling percentage of less than 80%.

The present invention of a method for producing a copper powder for additive manufacturing includes the step of baking a copper powder at a temperature of 100° C. or more and 500° C. or less for 0.1 hours or more and 72 hours or less to produce a powder having a mean particle size of 1 μm or more and 150 μm or less and containing copper oxide in an amount of 0.10 $g/m^2$ or more and 7.0 $g/m^2$ or less per unit surface area and 0.5 mass % or more and 9.4 mass % or less per unit mass.

In the present invention of the method for producing a copper powder for additive manufacturing, the powder may be made to have a rate of change specific surface area of 50% or less in the step. In the present invention of the method for producing a copper powder for additive manufacturing, the powder may be made have a coating peeling percentage of less than 80% in the step.

The present invention of a method for producing an additive manufactured product includes a building step of forming a building layer by irradiating energy at a predetermined position of a copper powder for additive manufacturing having a mean particle size of 1 μm or more and 150 μm or less and containing copper oxide in an amount of 0.10 $g/m^2$ or more and 7.0 $g/m^2$ or less per unit surface area and 0.5 mass % or more and 9.4 mass % or less per unit mass with energy to solidify the predetermined position; and a layer addition step of adding the building layer in layers by repeating the building step.

The present invention of another method for producing an additive manufactured product includes a building step of forming a building layer by heat-melting and solidifying a copper powder for additive manufacturing having a mean particle size of 1 μm or more and 150 μm or less and containing copper oxide in an amount of 0.10 $g/m^2$ or more and 7.0 $g/m^2$ or less per unit surface area and 0.5 mass % or more and 9.4 mass % or less per unit mass while feeding the copper powder to a predetermined position; and a layer addition step of adding the building layer in layers by repeating the building step.

The present invention of the method for producing an additive manufactured product may further include a powder producing step of producing the copper powder for additive manufacturing by baking a copper powder at a temperature of 100° C. or more and 500° C. or less for 0.1 hours or more and 72 hours or less.

In the present invention of the method for producing an additive manufactured product, the copper powder for additive manufacturing may have a rate of change of specific surface area of 50% or less.

In the present invention of the method for producing an additive manufactured product, the copper powder for additive manufacturing may have a coating peeling percentage of less than 80%.

The present invention of an additive manufactured product contains 90 mass % or more of copper, has a relative density of 94% or more, and an electrical conductivity of 50% IACS or more.

The present invention of an additive manufactured product may have a percentage of voids determined from cross-section observation of 15% or less.

The present invention of an additive manufactured product may contain 0.1 mass % or more and 6.0 mass % or less of cuprous oxide ($Cu_2O$).

The present invention of the additive manufactured product may have an electrical conductivity of 60% IACS or more.

Effects of Invention

According to the present invention, a copper powder for additive manufacturing that can sufficiently improve the mechanical strength and electrical conductivity of a manufactured product can be provided.

According to the present invention, an additive manufactured product having sufficiently high mechanical strength and electrical conductivity, and a method for producing the same can be provided.

BRIEF DESCRIPTION OF DRAWINGS

FIGS. 5-22 correspond to Tables 1-18, respectively, described herein.

DESCRIPTION OF EMBODIMENTS

Figure 1:
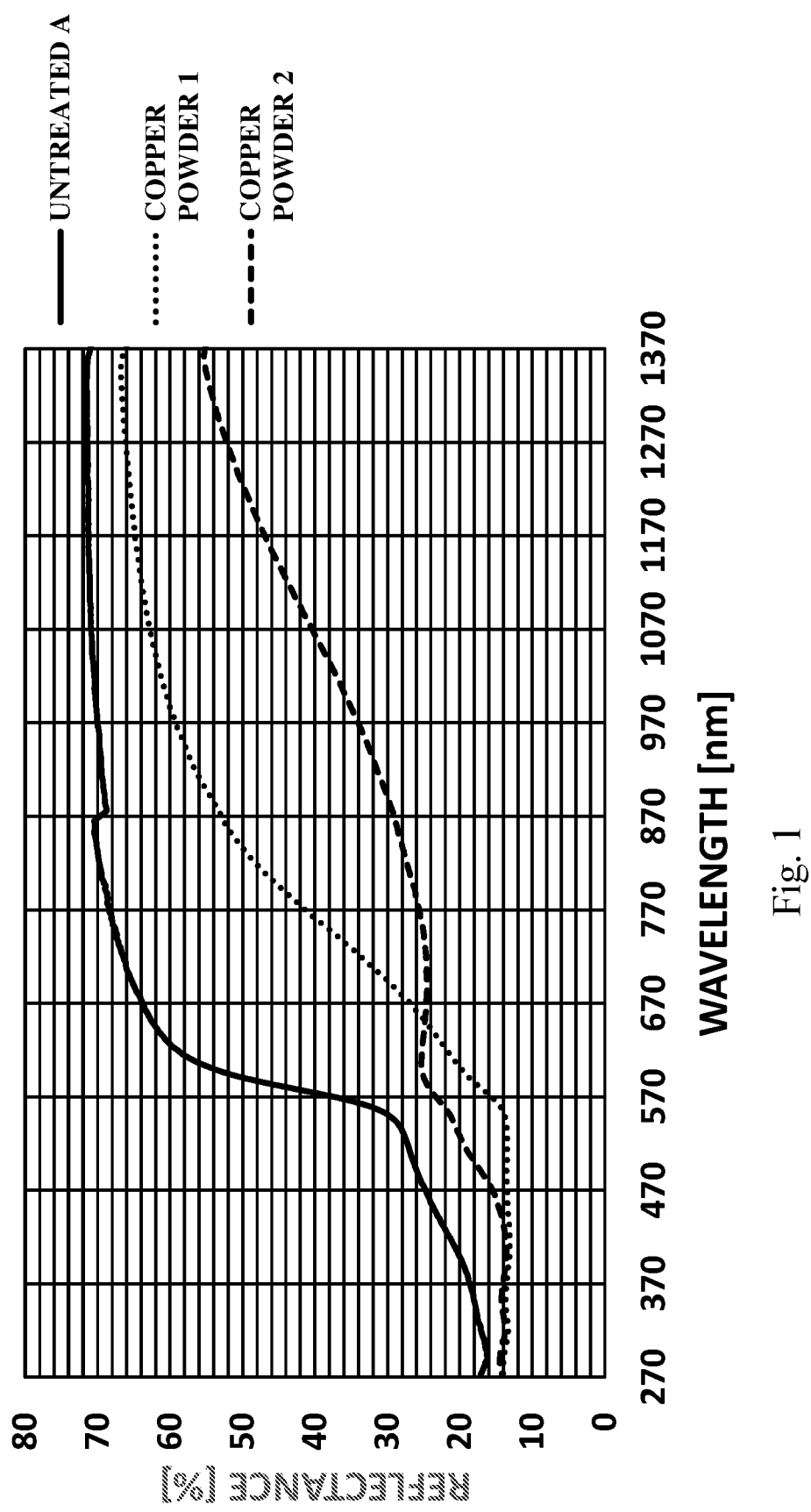
FIG. 1 is a graph showing the reflectance of copper powders.
Figure 2:
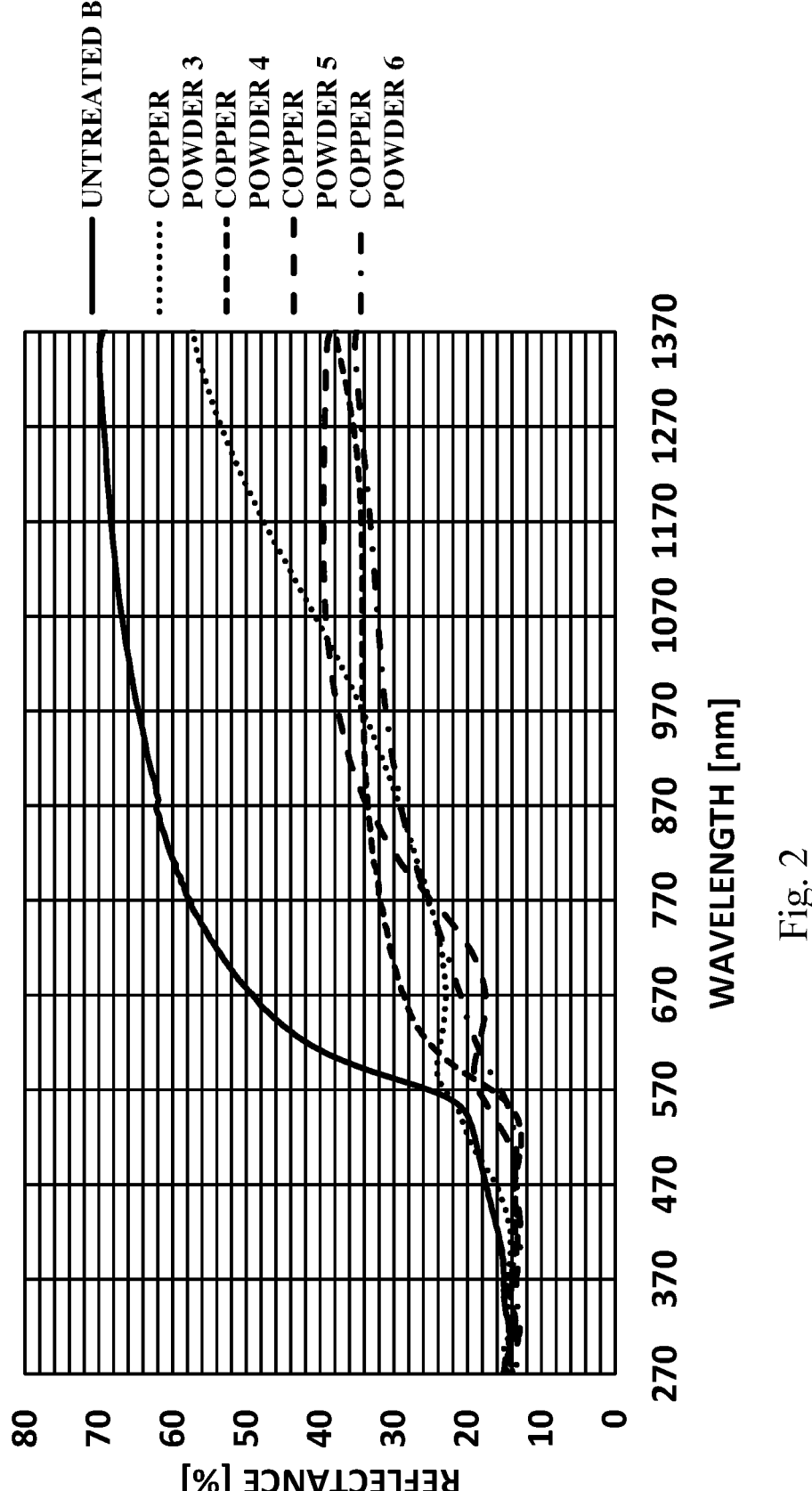
FIG. 2 is a graph showing the reflectance of copper powders.
Figure 3:
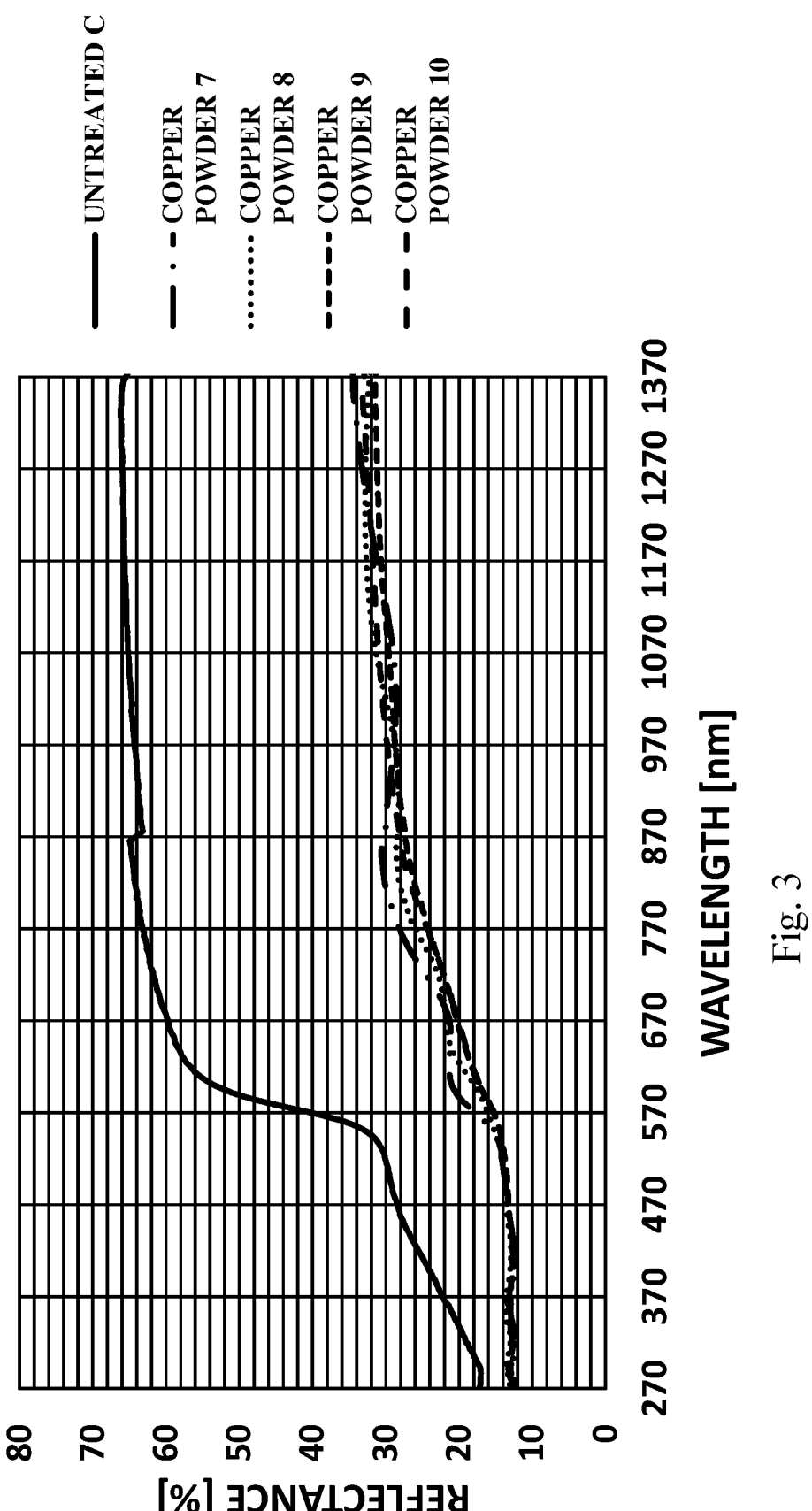
FIG. 3 is a graph showing the reflectance of copper powders.
Figure 4:
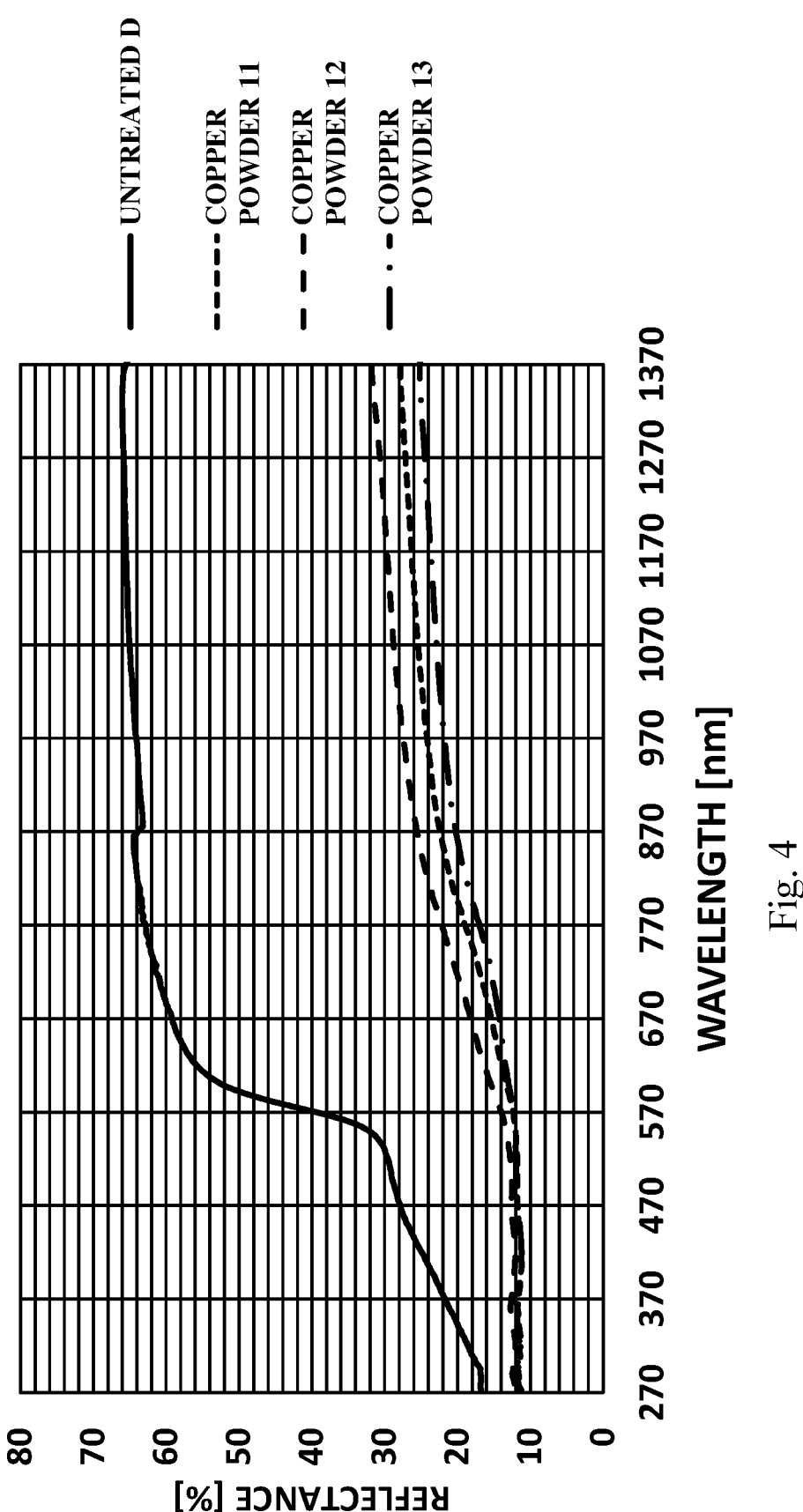
FIG. 4 is a graph showing the reflectance of copper powders.

Hereinafter, embodiments of the copper powder for additive manufacturing (hereinafter, also simply referred to as copper powder), the method for producing the same, the additive manufactured product, and the method for producing the same (hereinafter, also simply referred to as method for production) of the present invention will be described. (Copper Powder for Additive Manufacturing)

The copper powder of the present embodiment is a copper powder for additive manufacturing having a mean particle size of 1 μm or more and 150 μm or less, containing: copper oxide in an amount of 0.10 g/m$^2$ or more and 7.0 g/m$^2$ or less per unit surface area and 0.5 mass % or more and 9.4 mass % or less per unit mass.

The term "copper" as used in this embodiment means pure copper and a copper alloy containing 90 mass % or more of copper. The "copper powder" in the present embodiment means a powder having less than 10 mass % of metal components other than copper.

The copper powder of the present embodiment has a mean particle size of 1 μm or more and 150 μm or less, for example, 2.5 μm or more and 120 μm or less, 5 μm or more and 9 μm or less.

When the mean particle size of the copper powder is within the above-mentioned range, the fluidity of the powder can be improved, and the density and electrical conductivity of the additive manufactured product can be improved.

In the present embodiment, the mean particle size of the powder means the median diameter determined from the particle size distribution measured by a laser diffraction type particle size distribution measuring device.

The copper powder of the present embodiment has a copper oxide concentration per unit surface area of 0.10 g/m$^2$ or more and 7.0 g/m$^2$ or less, for example, 0.15 g/m$^2$ or more and 6.0 g/m$^2$ or less, 0.20 g/m$^2$ or more and 5.0 g/m$^2$ or less.

When the copper oxide concentration per unit surface area of the copper powder is within the above-mentioned range, the density and electrical conductivity of the additive manufactured product can be improved.

The copper oxide concentration per unit surface area is a value obtained by dividing the copper oxide concentration (mass %) in the coating on the surface of the copper powder by the specific surface area (m$^2$/g) of the copper powder and 100, and specifically a value measured by the method shown in Examples.

The preferable range of the copper oxide concentration per unit surface area can vary depending on the mean particle size of the copper powder.

For example, when the mean particle size is less than 5 μm, the copper oxide concentration is 0.10 g/m$^2$ or more and 0.70 g/m$^2$ or less, when the mean particle size is 5 μm or more and less than 15 μm, the copper oxide concentration is 0.15 g/m$^2$ or more and 1.3 g/m$^2$ or less, when the mean particle size is 15 μm or more and less than 25 μm, the copper oxide concentration is 0.3 g/m$^2$ or more and 2.3 g/m$^2$ or less, when the mean particle size is 25 μm or more and less than 60 μm, the copper oxide concentration is 0.5 g/m$^2$ or more and 4.8 g/m$^2$ or less, and when the mean particle size is 60 μm or more, the copper oxide concentration is 0.8 g/m$^2$ or more and 7.0 g/m$^2$ or less.

For example, the copper powder for additive manufacturing of the present embodiment contains 0.5 mass % or more and 9.4 mass % or less per unit mass, 0.5 mass % or more and 9.0 mass % or less per unit mass, 0.5 mass % or more and 8.0 mass % or less per unit mass, 1.3 mass % or more and 9.4 mass % or less per unit mass, 1.3 mass % or more and 9.0 mass % or less per unit mass, or 1.3 mass % or more and 8.0 mass % or less per unit mass of copper oxide.

The copper oxide concentration means a value measured (calculated) by acid dissolution process, and specifically, is a value measured by the method shown in Examples.

The copper powder for additive manufacturing of the present embodiment may contain either cuprous oxide ($Cu_2O$) or cupric oxide (CuO) as copper oxide, or can contain both.

When the copper powder for additive manufacturing of the present embodiment contains cuprous oxide ($Cu_2O$), the copper powder contains, for example, 0.5 mass % or more and 9.4 mass % or less, 0.5 mass % or more and 9.0 mass % or less, 0.5 mass % or more and 8.0 mass % or less, 1.3 mass % or more and 9.4 mass % or less, 1.3 mass % or more and 9.0 mass % or less, or 1.3 mass % or more and 8.0 mass % or less of cuprous oxide.

When cuprous oxide ($Cu_2O$) is contained as copper oxide in the above concentration range, the density and electrical conductivity of the additive manufactured product can be improved.

The cuprous oxide concentration is a value calculated based on the value measured by acid dissolution process, and specifically, is a value measured by the method shown in Examples.

The copper powder of the present embodiment may contain copper oxide containing cuprous oxide as a copper oxide coating on the surface, or may contain copper oxide containing cuprous oxide in the entire copper powder as long as the copper oxide concentration is within the above-mentioned range.

When the copper oxide coating is present on the surface of the copper powder, the surface of the copper powder can be modified, and as a result, the density of the additive manufactured product can be improved and the mechanical strength can be improved. Meanwhile, copper can be retained at a high concentration inside the copper powder, and as a result, an additive manufactured product having a high electrical conductivity can be formed.

The copper powder for additive manufacturing of the present embodiment preferably has a low content of cupric oxide (CuO), and is preferably substantially free of cupric oxide.

Being free of cupric oxide means that CuO is not detected when the copper powder is analyzed by the method described in Examples described later.

The copper powder for additive manufacturing of the present embodiment may have a content of cuprous oxide ($Cu_2O$) of 1.3 mass % or more and 9.4 mass % or less, and a content of cupric oxide (CuO) of 1.7 mass % or less.

The shape of the copper powder is not particularly limited, and can be spherical, flake-shaped, plate-shaped, needle-shaped, indefinite or the like. When additive manufacturing is performed by the powder bed fusion method described later, a spherical shape or a substantially spherical shape having an aspect ratio of 2 or less is preferable because the powder can be spread with the gaps between powders reduced during the formation of the powder layer. The surface of the metal powder may have irregularities. Secondary particles may be deposited on the surface of the metal powder.

The reflectance for light having a wavelength of 1070 nm of the copper powder is, for example, 65% or less, or 60% or less, and is even more preferably 55% or less. When the copper powder has such a reflectance, the utilization efficiency of energy of, for example, a laser irradiated to melt and solidify the metal powder is improved, and thus, the metal powder can become a material for an additive manufactured product having a higher density and higher mechanical strength and electrical conductivity.

The wavelength in this embodiment is preferably a wavelength of Yb (ytterbium) fiber laser light, which is the mainstream in laser additive manufacturing.

The copper powder has an angle of repose of, for example, 50 degrees or less, 45 degrees or less, or 40 degrees or less. When the angle of repose of the copper powder is within the above-mentioned range, the fluidity of the copper powder is improved, the powder layer can be formed in a dense state when manufacturing the additive manufactured product, and the copper powder can be melted and solidified. Thus, the copper powder can become a material for an additive manufactured product having a higher density, mechanical strength, and electrical conductivity.

The angle of repose used in this embodiment means a value measured by the method described in Example described later.

The copper powder of the present embodiment has a rate of change of specific surface area of, for example, 50% or less, 45% or less, or 43% or less.

When the rate of change of specific surface area is within the above-mentioned range, the density and electrical conductivity of the additive manufactured product can be improved.

The rate of change of specific surface area in the present embodiment is a value obtained as follows: the copper oxide coating on the surface of the copper powder is removed by a predetermined method, the specific surface area of the copper powder before the removal and the specific surface area of the copper powder after the removal are compared, and the difference expressed in % is taken as a rate of change. Specifically, it refers to a value measured by the method shown in Example.

The copper powder of the present embodiment has a coating peeling percentage of, for example, less than 80%, alternatively 77% or less, further 70% or less, or further 45% or less.

When the coating peeling percentage is within the above-mentioned range, the density and electrical conductivity of the additive manufactured product can be improved.

The coating peeling percentage in the present embodiment specifically refers to a value measured by the method shown in Example.

(Method for Producing a Copper Powder for Additive Manufacturing: Powder Producing Step)

The method for producing a copper powder of the present embodiment is not particularly limited. A material having a predetermined composition may be powdered, or the copper powder may be adjusted by surface treating the raw material powder.

As the raw material copper powder, copper powders formed by a mechanical method, a chemical method, an atomizing method or the like can be used without limitation. To obtain a spherical or substantially spherical powder, a gas atomizing method, a water atomizing method, a disc atomizing method, a plasma rotating electrode method, a thermal plasma method and the like are preferable. Generally, because the particle size generally hardly changes before and after the surface treatment, the raw material copper powder preferably has a particle size equivalent to that of the copper powder for an additive manufactured product.

Examples of the surface treatment include baking, heat treatment of the raw material copper powder by laser light irradiation, and surface treatment by bringing the raw material copper powder into contact with the surface treatment liquid.

Examples of the surface treatment by bringing the raw material copper powder into contact with the surface treatment liquid include a method of bringing the surface of the raw material copper powder into contact with a solution that forms an oxide coating in the form of mist by a spray and the like and a method of immersing the raw material powder in a solution. The treatment conditions such as the temperature at the time of the treatment and the treatment time can be appropriately selected according to the shape and particle size of the raw material powder, the composition of the surface treatment liquid and the like.

The copper powder for an additive manufactured product of the present embodiment as described above can be also produced by treating a copper powder by baking.

Hereinafter, a method for producing a copper powder for an additive manufactured product according to the present invention by baking will be described.

The method for producing a copper powder for additive manufacturing of the present embodiment includes the step of baking a copper powder at a temperature of 100° C. or more and 500° C. or less for 0.1 hours or more and 72 hours or less to produce a powder having a mean particle size of 1 μm or more and 150 μm or less and containing copper oxide in an amount of 0.10 $g/m^2$ or more and 7.0 $g/m^2$ or less per unit surface area and 0.5 mass % or more and 9.4 mass % or less per unit mass.

As the copper powder used in the present embodiment, for example, copper powders formed by the above-mentioned mechanical method, chemical method, atomizing method or the like can be used without limitation.

For the particle size of the copper powder, the copper powder also preferably has a particle size equivalent to the particle size of the copper powder for an additive manufactured product as described above.

The baking conditions for baking in this embodiment are, for example, conditions of a temperature of 100° C. or more and 500° C. or lower, 110° C. or more and 400° C. or less, or 120° C. or more and 300° C. or less for 0.1 hour or more and 72 hours or less, 0.25 hours or more and 48 hours or less, or 0.5 hours or more and 24 hours or less.

The method for production of the present embodiment includes the step of producing a powder having a mean particle size of 1 μm or more and 150 μm or less and containing copper oxide in an amount of 0.10 $g/m^2$ or more and 7.0 $g/m^2$ or less per unit surface area and 0.5 mass % or more and 9.4 mass % or less per unit mass, by adjusting the baking conditions among the above.

Such a method for producing a copper powder for additive manufacturing can be performed as one step in the method for producing an additive manufactured product described later, or may be performed as a producing step of a copper powder separately from the production of an additive manufactured product.

In the method for producing a copper powder for additive manufacturing of the present embodiment, the powder in the above-mentioned step may have a rate of change of specific surface area of 50% or less.

The method for adjusting the rate of change of specific surface area to the above-mentioned range is not particularly limited, and examples thereof include a method of forming a copper oxide coating on the surface of the copper powder and adjusting the amount thereof. More specific examples thereof include a method of adjusting the rate of change of specific surface area to the above-mentioned range by appropriately adjusting the baking temperature, baking time and the like in the above-mentioned step.

Alternatively, examples thereof include a method of adjusting the rate of change of specific surface area to the above-mentioned range by appropriately adjusting the dispersion state of the powder during baking. The process of formation of the copper oxide coating differs between the state where the copper powders are in contact with each other and the state where the copper powders are dispersed, and thus, the rate of change of specific surface area can also be adjusted by adjusting the dispersion state, for example, by dispersing the copper powder by a gas during baking.

In the method for producing a copper powder for additive manufacturing of the present embodiment, the powder in the above-mentioned step may have a coating peeling percentage of less than 80%.

The means for adjusting the coating peeling percentage to the above-mentioned range is not particularly limited, and examples thereof include a means of adjusting the coating peeling percentage in the above range by appropriately adjusting the baking temperature, baking time, dispersion state of the copper powder and the like in the above-mentioned step.

(Method for Producing an Additive Manufactured Product)

A method for producing an additive manufactured product using the copper powder of the present embodiment will be described.

As a method of additive manufacturing in which a copper powder is used, a general method for producing an additive manufactured product using a metal powder (copper powder) can be employed.

For example, a method of applying high-density energy to a metal powder to melt and solidify the metal powder is suitable. Examples of the energy source for melting and solidifying the metal powder include a laser, an electron beam, and plasma. Among them, a method in which a laser is used is preferable, because the metal powder can be melted by local application of high-density energy. Examples of the additive manufacturing method of a metal powder in which a laser is used include the powder bed fusion method and the metal deposition method.

In the powder bed fusion method, a metal powder is disposed in layers to form a powder layer, and energy is irradiated to a predetermined position of the powder layer to melt and solidify the metal powder, thereby a building layer is formed. By repeating the formation of the powder layer and the formation of the building layer by energy irradiation, a three-dimensional additive manufactured product having any shape can be produced.

In the metal deposition method, a predetermined position is heated with energy of a laser or the like, and a metal powder is fed and solidified at the predetermined position to form a building layer. By repeating the formation of the building layer, a three-dimensional additive manufactured product can be produced. In particular, the powder bed fusion method has the advantages of high processing accuracy and capability to form a high-density manufactured product.

The powder bed fusion method is suitable for producing prototypes and only one manufactured product, and the metal deposition method is suitable for coating and repairing of the surface of existing base materials and parts.

An additive manufacturing method in which the powder bed fusion method is used will be described below.

In additive manufacturing, slice data for additive manufacturing is first produced based on the three-dimensional shape data of a manufactured product. For example, three-dimensional shape data produced by 3D-CAD or the like is converted into STL (Stereolithography) data by element division by the finite element method, and slice data is produced from the STL data. The slice data is data obtained by dividing the STL data of a manufactured product into N along the height direction (building direction), and includes the shape data (xy coordinates) of each building layer from the first layer to the Nth layer. The slice thickness d is about 10 to 150 μm. This slice thickness d corresponds to a lamination thickness of one layer in additive manufacturing.

Additive manufacturing is performed based on slice data. Additive manufacturing is preferably performed under an atmosphere of an inert gas such as nitrogen, argon, and helium or under a reduced pressure atmosphere to suppress oxidation of the manufactured product.

[Powder Layer Forming Step]

The above-mentioned metal powder is spread over a predetermined area on a table that can be raised and lowered to form a powder layer having a predetermined thickness (d). The powder layer can contain a laser absorber or the like in addition to the above-mentioned metal powder. The surface of the powder layer may be smoothed by a squeegee blade or the like, if necessary.

[Building Step]

A predetermined position of the powder layer is irradiated with energy based on the slice data. As described above, examples of the energy for irradiation include a laser, an electron beam, and plasma, and a laser is particularly preferable. The powder layer may be heated in advance prior to the energy irradiation by a laser or the like. The metal powder in the energy irradiation region is melted or sintered and solidified to form a building layer. The metal powder in the region not irradiated with energy does not solidify and remains in a powder state.

As the laser, a fiber laser, a YAG laser, a carbon dioxide gas laser, a semiconductor laser and the like are used. The laser output is preferably about 50 to 1000 W. The scanning speed of the laser is, for example, about 1 to 5000 mm/sec. The scanning pitch of the laser is about 10 to 500 m. The energy density of the laser is adjusted, for example, in the range of 50 to 1000 J/mm$^3$. The energy density E of the laser is represented by $E=P/v \cdot s \cdot d$. P is the laser output, v is the scanning speed, s is the scanning pitch, and d is the slice thickness (lamination thickness).

By the above-mentioned powder layer forming step and building step, a building layer corresponding to the first layer of slice data is formed. Then, the table is lowered by the slice thickness d. Instead of lowering the table, the laser light source may be raised to adjust the relative positional relationship between the powder layer and the laser light source. A metal powder is spread on the first layer after formation of the building layer to form the powder layer of the second layer, and a predetermined position of the powder layer is irradiated with a laser based on the slice data of the second layer to form the building layer.

Then, the powder layer forming step and the building layer forming step by energy irradiation based on the slice data of the nth layer (n≤N) are repeated from the third layer to the Nth layer. Finally, the additive manufactured product is completed by removing the unsolidified metal powder in the region unirradiated with energy. The additive manufactured product can be subjected to post-treatment. Examples of the post-treatment include heating. By performing post-treatment such as heating, the mechanical strength and electrical conductivity of the additive manufactured product may be improved.

Although the method for producing an additive manufactured product based on the powder bed fusion method has been described above, the general additive manufacturing method for producing an additive manufactured product using the copper powder of the present embodiment is not limited to this, and for example, an additive manufacturing method based on the metal deposition method may be employed.

The manufacturing method based on the metal deposition method is a method of heat-melting and solidifying the metal powder for manufacturing while feeding the metal powder to a predetermined position, for example, while the metal powder is injected from the nozzle and at the same time irradiated with laser light, instead of disposing the metal powder in layers to form a powder layer. By injecting the metal powder while moving the nozzle or a predetermined position (stage and the like on which the layer-added product is formed), a manufactured product having a desired shape can be obtained.

This method has an advantage that a desired portion of various existing manufactured products (base material or part) can be easily coated or repaired by additionally forming a manufactured product in the desired portion.

In any general method for producing an additive manufactured product as described above, the copper powder for additive manufacturing of the present embodiment can be used.

Examples of the method for producing an additive manufactured product of the present embodiment include a method for producing an additive manufactured product, including: a building step of forming a building layer by irradiating energy at a predetermined position of a copper powder for additive manufacturing having a mean particle size of 1 μm or more and 150 μm or less and containing copper oxide in an amount of 0.10 g/m$^2$ or more and 7.0 g/m$^2$ or less per unit surface area and 0.5 mass % or more and 9.4 mass % or less per unit mass with energy to solidify the predetermined position; and a layer addition step of adding the building layer in layers by repeating the building step.

Alternatively, examples thereof include a method for producing an additive manufactured product, including: a building step of forming a building layer by heat-melting and solidifying a copper powder for additive manufacturing having a mean particle size of 1 μm or more and 150 μm or less and containing copper oxide in an amount of 0.10 g/m$^2$ or more and 7.0 g/m$^2$ or less per unit surface area and 0.5 mass % or more and 9.4 mass % or less per unit mass while feeding the copper powder to a predetermined position; and a layer addition step of adding the building layer in layers by repeating the building step.

(Additive Manufactured Product)

The additive manufactured product of the present embodiment contains 90 mass % or more of copper, has a relative density of 94% or more, and a electrical conductivity of 50% IACS or more.

The manufactured product produced by additive manufacturing can have a complicated shape that cannot be realized by cutting. In the present invention, a copper powder is used as a material for additive manufacturing, and thus, the obtained additive manufactured product contains copper as a main component.

The composition of the additive manufactured product can be same as or different from that of the raw material copper powder.

The content of copper oxide in the additive manufactured product tends to be smaller than the content in the copper powder. The additive manufactured product may contain unavoidable impurities.

The content of copper in the additive manufactured product is, for example, 90 mass % or more, 95 mass % or more, and 97 mass % or more.

When the content of copper is within the above-mentioned range, high electrical conductivity can be obtained.

The relative density of the additive manufactured product is preferably 94% or more, further preferably 95% or more, and further preferably 96% or more. When the relative density of the additive manufactured product is within the above-mentioned range, the mechanical strength is improved.

The relative density in the present embodiment is a relative density measured by the Archimedes method, and specifically refers to a density measured by the measuring method described in Examples described later.

The electrical conductivity of the additive manufactured product of the present embodiment is 50% IACS or higher, further preferably 60% IACS or higher, further preferably 69% IACS or higher, further preferably 70% IACS or higher, and particularly preferably 80% or higher. The IACS % is the electrical conductivity when the electrical conductivity $(1.7241 \times 10^{-20} \mu\Omega \cdot m)$ of the International Annealed Copper Standard (IACS) is defined as 100% IACS.

When the additive manufactured product is used as an electric material, the electrical conductivity is preferably high. When the electrical conductivity is within the above-mentioned range, the additive manufactured product becomes one that can be suitably used as an electric material.

When the electrical conductivity is within the above-mentioned range, the additive manufactured product becomes one that can be also suitably used as a heat conductive material according to Wiedemann-Franz law $(\kappa/\sigma=LT$, $\kappa$: heat electrical conductivity, $\sigma$: electrical conductivity, T: absolute temperature, L: Lorentz number $2.31 \times 10^{-8}$ Js$^{-1}$ $\Omega$K$^{-2}$).

In the additive manufactured product of the present embodiment, the percentage of voids determined from cross-section observation is preferably 15% or less, further preferably 10% or less, further preferably 7% or less, further preferably 5% or less, and further preferably 3% or less.

The smaller the percentage of voids of the additive manufactured product, the better the mechanical strength and electrical conductivity tend to be.

By using the copper powder according to the present embodiment described above as a material of an additive manufactured product, a high-density additive manufactured product having smaller percentage of voids than that in the case where a general copper powder is used can be formed.

The additive manufactured product of the present embodiment can contain, for example, 0.1 mass % or more and 6.0 mass % or less of cuprous oxide (Cu$_2$O), or 0.3 mass % or more and 5.7 mass % or less of cuprous oxide (Cu$_2$O).

When the concentration of cuprous oxide in the additive manufactured product is within the above-mentioned range, a high electrical conductivity and mechanical strength are obtained.

The copper powder for additive manufacturing, the method for producing a copper powder for additive manufacturing, the method for producing an additive manufactured product, and the additive manufactured product of the present embodiment should be each independently construed. Thus, the additive manufactured product of the present embodiment can be performed using the copper powder for an additive manufactured product of the present embodiment in the method for producing an additive manufactured product, and further each embodiment can be performed using a combination of other techniques.

Though the copper powder for additive manufacturing, the method for producing a copper powder for additive manufacturing, the method for producing an additive manufactured product, and the additive manufactured product according to the present embodiment are as described above, the embodiments disclosed herein should be considered as an example and not restrictive in every respect. The scope of the present invention is shown not by the above-mentioned descriptions but by Claims, and it is intended that all modifications within the meaning and scope equivalent to Claims are included.

EXAMPLES

Hereinafter, the present invention will be described in more detail with reference to Examples, but the present invention is not limited to these examples.

(Test 1)

[Preparation of Copper Powder]

As a raw material, atomized powders of pure copper having different mean particle sizes (10 μm, 20 μm, 46 μm, and 80 μm) were prepared, and the pure copper powders of each size were fired using a baking furnace for the baking times at the baking temperatures shown in Table 1 (FIG. 5) to obtain each copper powder.

The untreated pure copper powders were designated as untreated A to D.

10 μm: untreated copper powder A Cu—HWQ10 (pure copper)

20 μm: untreated copper powder B Cu—HWQ20 (pure copper)

46 μm: untreated copper powder C Cu—At-200At2 (pure copper)

80 μm: untreated copper powder D Cu—At-100 (pure copper), one which was classified with a sieve having an aperture of 52 μm and a sieve having an aperture of 125 μm, and was subjected to the particle size distribution measurement with a laser diffraction type particle size distribution measuring device (SALD-2300 manufactured by Shimadzu Corporation) to be confirmed to have a median diameter of 80 m.

Table 1 is shown in FIG. 5.

[Additive Manufactured Product]

Each additive manufactured product was prepared using untreated copper powders A and B, and copper powders 1 to 13.

Using "EOSINT M280" manufactured by EOS Germany, a cylindrical manufactured product having a diameter of 8 mm and a height of about 12 mm was produced under the following conditions in a nitrogen gas flow atmosphere (residual oxygen concentration of about 0.5%).

Laser output: 370 W

Scanning speed: 200 to 1200 mm/sec

Scanning pitch: 0.1 mm lamination thickness: 0.04 mm

The scanning speed was based on the speed shown in each Table.

[Evaluation]

<Relative Density of Additive Manufactured Product>

The relative density of the additive manufactured product was measured by the Archimedes method using water as a liquid according to JIS Z2501: 2000, and the ratio to the density of copper (8.94 g/cm$^3$) was calculated.

<Percentage of Voids of Additive Manufactured Product>

The obtained additive manufactured product (cylinder: height of 12 mm, diameter of 8 mm) was cross-section polished by a cross section. The cross section (near the center of the circle) was observed with an optical microscope (magnification 50 times), and an image at a magnification of 50 times was binarized based on the brightness using the measurement software attached to VHX (manufactured by KEYENCE CORPORATION, digital microscope). From the area of the void in the observation image, Percentage of voids (%)=100×(void area)÷(observation area)

was calculated.

<Electrical Conductivity of Additive Manufactured Product>

The electrical conductivity (% IACS) of the additive manufactured product was measured using an eddy current electrical conductivity meter.

<Cu$_2$O Concentration>

The cross section of the obtained additive manufactured product was analyzed with an X-ray diffractometer (manufactured by Rigaku Corporation, SmartLab9 kW) under the conditions of Cu tube, tube voltage of 45 kV, tube current of 200 mA, scanning speed of 20°/min, and sampling interval of 0.01°. The Cu$_2$O concentration of the copper powder sample were calculated using a calibration curve produced in advance based on the results of analysis of Cu$_2$O at a known concentration with the same X-ray diffractometer.

The results are shown in Tables 2 to 16 (FIGS. 6-20).

Table 2 is shown in FIG. 6.
Table 3 is shown in FIG. 7.
Table 4 is shown in FIG. 8.
Table 5 is shown in FIG. 9.
Table 6 is shown in FIG. 10.
Table 7 is shown in FIG. 11.
Table 8 is shown in FIG. 12.
Table 9 is shown in FIG. 13.
Table 10 is shown in FIG. 14.
Table 11 is shown in FIG. 15.
Table 12 is shown in FIG. 16.
Table 13 is shown in FIG. 17.
Table 14 is shown in FIG. 18.
Table 15 is shown in FIG. 19.
Table 16 is shown in FIG. 20.

(Test 2)

Each measurement was performed using untreated C and D in addition to the above-mentioned copper powders.

<Angle of Repose>

Each angle of repose of untreated copper powders A to D and copper powders 1 to 13 was measured.

Each copper powder was gently deposited on a brass cylindrical sample table (height of 5 mm, (Φ of 10 mm) using a spatula until it spilled from the sample table, and photographed with a digital camera. The angle of repose was measured using the image analysis software ImageJ from the image.

<Cu$_2$O Concentration Per Unit Mass>

To 200 ml of a solution of 0.2 mol/L hydrochloric acid and 99.5% methanol mixed at a volume ratio of 1:1, 0.1 g of octylamine was first added, and the mixture was deoxidized with nitrogen gas for 10 minutes while stirring with a stirrer. Further, 200 mg of a copper powder sample was added while flowing nitrogen gas. After stirring until the copper concentration of the filtrate was saturated, the mixture was filtered using filter paper 4A manufactured by ADVANTECH CO., LTD. The filtrate was diluted 50 times to measure the copper concentration with an ICP emission spectrophotometer (PS3520UVDDII, manufactured by Hitachi, Ltd.).

Each copper powder was analyzed with an X-ray diffractometer (manufactured by Rigaku Corporation, SmartLab9 kW) under the conditions of Cu tube, tube voltage of 45 kV, tube current of 200 mA, scanning speed of 20°/min, and sampling interval of 0.01°. When CuO was not detected, the copper oxide and oxygen concentrations were calculated with the copper concentration measured being considered to be the concentration of copper all derived from Cu$_2$O.

<CuO Concentration>

Each copper powder sample was analyzed with the above-mentioned X-ray diffractometer. When CuO was detected in addition to Cu$_2$O, the mass ratio of Cu$_2$O to CuO in the copper powder sample was calculated using the calibration curve prepared in advance based on the results of analysis of the mixture of Cu$_2$O and CuO at a known mass ratio with the same X-ray diffractometer. Subsequently, the CuO concentration was calculated from the measurement result of the copper oxide concentration measured by the acid dissolution process and the mass ratio of CuO.

The concentration that can be measured by the above-mentioned method for measuring the CuO concentration was a concentration exceeding 1.7 mass %. That is, samples whose concentrations were known in advance (1.0 mass %, 1.2 mass %, 1.4 mass %, 1.5 mass %, 1,7 mass %, and 1.9 mass %) were prepared, and these samples were measured by the above-mentioned measurement method. The concentration of only the sample of 1.9 mass % was successfully measured, and CuO was not detected in the other samples. Thus, in this Example, when the CuO content was 1.7 mass % or less, it was considered that the copper powder substantially does not contain CuO, that is, has a CuO concentration of 0%.

<Specific Surface Area>

The specific surface area of each copper powder was measured.

[Specific Surface Area after Removal of Copper Oxide]

To 2 L of a solution of 1.0 mol/L hydrochloric acid and 99.5% methanol mixed at a volume ratio of 3:1, 0.7 g of octylamine was added, and the copper powder sample was added while stirring with a stirrer. The amount of the copper powder sample to be added at this time was 150 g when the copper oxide concentration was less than 4.0 mass % and 75 g when the copper oxide concentration was 4.0 mass % or more. After stirring until the copper concentration became equivalent to the copper concentration at the time of saturation after addition of the copper powder sample in the preparation method of samples of the above-mentioned <Copper oxide Cu$_2$O concentration per unit mass>, the mixture was filtered using filter paper 5C manufactured by ADVANTECH CO., LTD. to obtain a copper powder from which the copper oxide coating has been removed. In the preparation of the liquid before filtration, the hydrochloric acid concentration and the amount of octylamine were adjusted so that the copper oxide coating would be dissolved and the copper concentration of the filtrate would be saturated, and the above-mentioned concentration and amount were employed. The obtained copper powder was vacuum dried and sieved to obtain a sample for measuring a specific surface area. For the copper powder with a median diameter of 10 μm, a sieve with an aperture of 40 μm was used, for the copper powder with a median diameter of 20 μm, a sieve with an aperture of 90 μm was used, and for the copper powder with a median diameter of 45 m and the copper powder with a median diameter of 80 μm, a sieve with an aperture of 125 μm was used. The specific surface area was measured with a Blaine air permeability particle size measuring device (manufactured by Tokyo Rika Seiki Seisakusho).

[Specific Surface Area Before Removal of Copper Oxide]

Each copper powder was sieved. For the copper powder with a median diameter of 10 μm, a sieve with an aperture of 40 μm was used, for the copper powder with a median diameter of 20 μm, a sieve with an aperture of 90 μm was used, and for the copper powder with a median diameter of 45 μm and the copper powder with a median diameter of 80 μm, a sieve with an aperture of 125 μm was used. The specific surface area was measured with a Blaine air permeability particle size measuring device (manufactured by Tokyo Rika Seiki Seisakusho).

[Rate of Change of Specific Surface Area]

The rate of change of specific surface area of each copper powder was calculated by the following formula. The unit is [%].

[(Specific surface area before removal of copper oxide÷Specific surface area after removal of copper oxide)−1]×100

<Copper Oxide Concentration Per Unit Surface Area>

The copper oxide concentration per unit surface area of each copper powder was calculated by the following formula. The unit is [g/m²].

$Cu_2O$ concentration÷specific surface area÷100

<Coating Peeling Percentage>

The coating peeling percentage of each copper powder was measured and calculated by the following method.

An SEM image of the copper powder was photographed, the number of powders in which the copper oxide coating was peeled off out of 100 copper powders whose outlines were entirely observed based on the SEM image was counted, and the percentage of the powder in which the copper oxide coating was peeled off was calculated. The unit is [%].

Copper oxide coating peeling percentage [%]=number of coating peeling powders/100×100

The results are shown in Table 17 (FIG. 21).

Table 17 is shown in FIG. 21.

<Reflectance>

The results of measurement of the reflectance for light having a wavelength of 1070 nm of the above-mentioned copper powders with an ultraviolet-visible near-infrared spectrophotometer (SolidSpec-3700, manufactured by Shimadzu Corporation) are shown in Table 18 (FIG. 22).

Table 18 is shown in FIG. 22.

DISCUSSION

It was clear that additive manufactured products manufactured by a copper powder having a mean particle size and a content of copper oxide (per unit surface area, per unit mass) within a predetermined range tend to have a lower percentage of voids or a higher relative density, and a higher electrical conductivity compared to other copper powders (untreated copper powders and copper powder 6).

It was also shown that the angle of repose and reflectance of these copper powders are also within a predetermined range.

The invention claimed is:

1. A copper powder for additive manufacturing having a mean particle size of 1 μm or more and 150 μm or less and comprising:

copper oxide in an amount of 0.10 g/m² or more and 7.0 g/m² or less per unit surface area, copper oxide in an amount of 1.3 mass % or more and 9.4 mass % or less per unit mass, a content of cuprous oxide ($Cu_2O$) of 1.3 mass % or more and 9.4 mass % or less, and a content of cupric oxide (CuO) of 1.7 mass % or less.

2. The copper powder for additive manufacturing according to claim 1, having a reflectance for light having a wavelength of 1070 nm of 65% or less.

3. The copper powder for additive manufacturing according to claim 1, having an angle of repose of 50 degrees or less.

4. The copper powder for additive manufacturing according to claim 1, having a rate of change of specific surface area of 50% or less as calculated by the formula:

[(specific surface area before removal of copper oxide÷specific surface area after removal of copper oxide)−1]×100.

5. The copper powder for additive manufacturing according to claim 1, having a coating peeling percentage of less than 80% as calculated by the formula:

[number of coating peeling powders/100 copper powders counted]×100 wherein the number of coating peeling powders is the number of copper powders in an SEM image, in which a copper oxide coating was peeled off, out of 100 copper powders counted in the SEM image, and the 100 copper powders counted each had an outline that was entirely observed based on the SEM image.

6. A method for producing a copper powder for additive manufacturing, comprising the step of: baking a copper powder at a temperature of 100° C. or more and 500° C. or less for 0.1 hours or more and 72 hours or less to produce a powder having a mean particle size of 1 μm or more and 150 μm or less, containing copper oxide in an amount of 0.10 g/m² or more and 7.0 g/m² or less per unit surface area, containing copper oxide in an amount of 1.3 mass % or more and 9.4 mass % or less per unit mass, containing a content of cuprous oxide ($Cu_2O$) of 1.3 mass % or more and 9.4 mass % or less, and containing a content of cupric oxide (CuO) of 1.7 mass % or less.

7. A method for producing an additive manufactured product, comprising:

a building step of forming a building layer by irradiating energy at a predetermined position of a copper powder for additive manufacturing having a mean particle size of 1 μm or more and 150 μm or less, containing copper oxide in an amount of 0.10 g/m² or more and 7.0 g/m² or less per unit surface area, containing copper oxide in an amount of 1.3 mass % or more and 9.4 mass % or less per unit mass, containing a content of cuprous oxide ($Cu_2O$) of 1.3 mass % or more and 9.4 mass % or less, and containing a content of cupric oxide (CuO) of 1.7 mass % or less, with energy to solidify the predetermined position; and a layer addition step of adding the building layer in layers by repeating the building step.

8. A method for producing an additive manufactured product, comprising:

a building step of forming a building layer by heat-melting and solidifying a copper powder for additive manufacturing having a mean particle size of 1 μm or more and 150 μm or less and containing copper oxide in an amount of 0.10 g/m² or more and 7.0 g/m² or less per unit surface area, containing copper oxide in an amount of 1.3 mass % or more and 9.4 mass % or less per unit mass, containing a content of cuprous oxide ($Cu_2O$) of 1.3 mass % or more and 9.4 mass % or less, and containing a content of cupric oxide (CuO) of 1.7 mass % or less, while feeding the copper powder to a predetermined position; and a layer addition step of adding the building layer in layers by repeating the building step.

9. The method for producing an additive manufactured product according to claim 7, further comprising: a powder producing step of producing the copper powder for additive manufacturing by baking a copper powder at a temperature of 100° C. or more and 500° C. or less for 0.1 hours or more and 72 hours or less.

* * * * *